United States Patent Office 3,259,399
Patented July 5, 1966

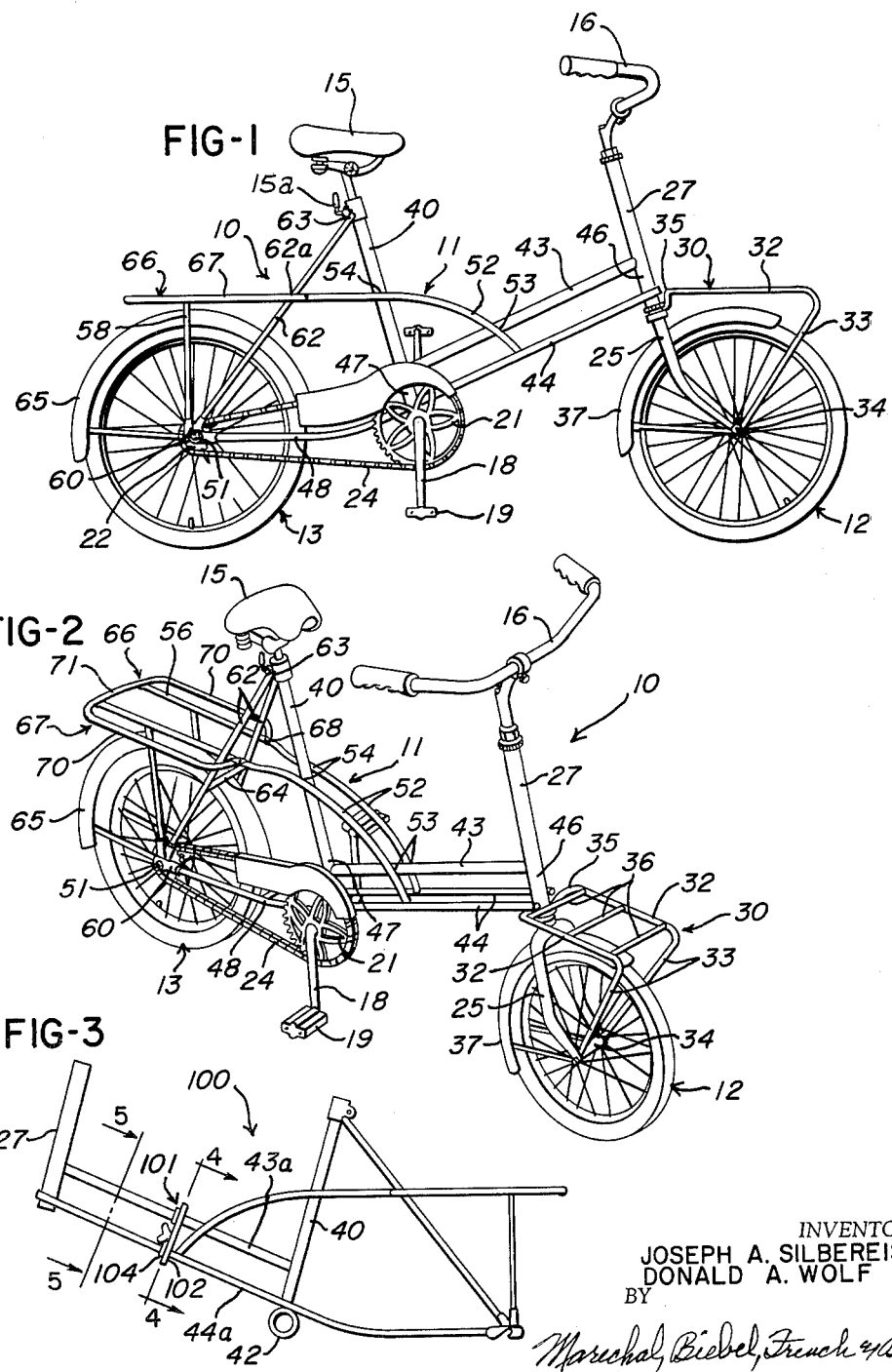

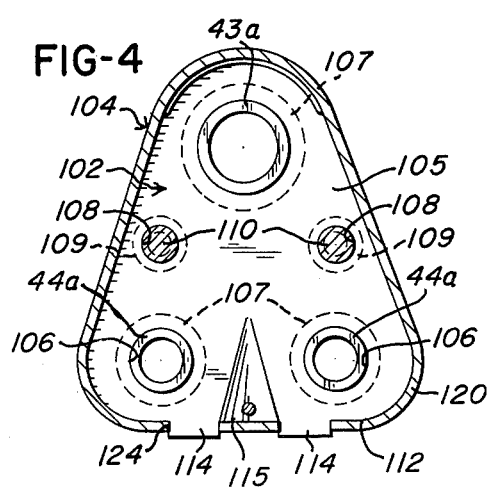
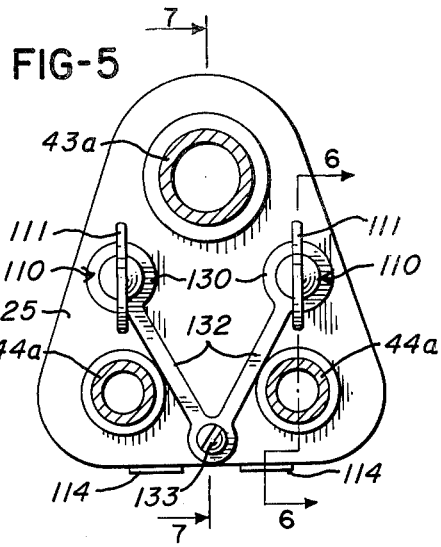
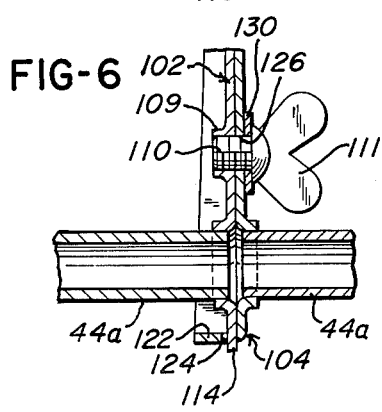
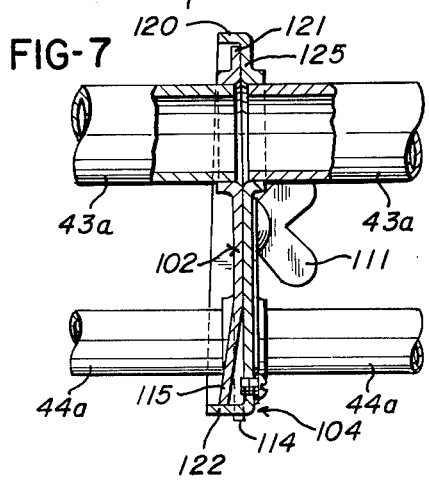
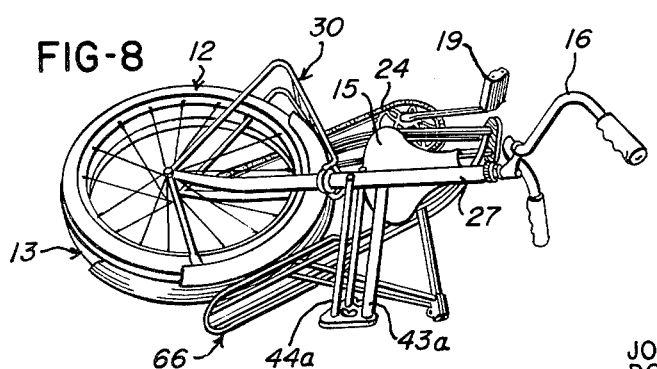

3,259,399
KNOCK-DOWN BICYCLE
Joseph A. Silbereis and Donald A. Wolf, Dayton, Ohio, assignors to The Huffman Manufacturing Company, Miamisburg, Ohio, a corporation of Ohio
Filed Oct. 13, 1965, Ser. No. 495,572
12 Claims. (Cl. 280—287)

This invention relates to bicycles, particularly to a bicycle having relatively small wheels and an improved frame configuration.

In recent years there has been an emergence of a bicycle design which has relatively small wheels but is intended for use by adults. The small wheels permit the bicycle to be quickly accelerated and decelerated and is easily maneuverable in tight situations. It is this type of bicycle to which the present invention is directed.

An important object of this invention is to provide a small wheeled adult bicycle having an improved frame construction, and further to provide a bicycle of the aforesaid type which is inexpensively manufactured in minimum time so that the cost to the consumer is comparatively low.

Another object of this invention is to provide a small wheeled bicycle of the aforesaid type wherein the luggage carrier above the rear wheel is formed by a portion of the frame members which are utilized to reinforce the seat mast, and wherein the frame is constructed entirely of deformed tubing welded together for maximum strength and rigidity.

Another object of this invention is to provide a small wheeled bicycle of the aforesaid type wherein the frame can be easily separated into two completely separate portions for storage or shipment, and particularly to provide such a bicycle having a separation joint in the lower reach bars between the seat mast and the handle bar mast which will remain engaged even though the connectors are disengaged.

A further object of this invention is to provide a bicycle which can be separated easily and quickly by merely removing two wing nuts so that the bicycle can be separated into separate units, and further to provide an improved connector assembly between the two portions of the bicycle.

Other objects and advantages of the invention will be apparent from the following description, the accompanying drawings and the appended claims.

In the drawings—

FIG. 1 is a side elevation view of a bicycle in accordance with the invention;

FIG. 2 is a perspective view showing the bicycle;

FIG. 2 is a side elevation view of the frame similar to that shown in FIGS. 1 and 2 but being capable of separation in two distinct portions;

FIG. 4 is a sectional view taken essentially along the line 4—4 of FIG. 3;

FIG. 5 is a sectional view similar to FIG. 4 and taken along the line 5—5 of FIG. 3;

FIG. 6 is another sectional view taken along the line 6—6 of FIG. 5;

FIG. 7 is another sectional view taken along the line 7—7 of FIG. 5; and

FIG. 8 is a perspective view showing the separated portions of the bicycle lying one on top of another to illustrate the small package that is formed by the separated bicycle.

Referring to the drawings wherein a preferred embodiment of the invention is shown, FIG. 1 illustrates a bicycle 10 having a frame 11 which is supported for movement on the front and rear wheels 12 and 13. The saddle 15 supports the rider who conveniently grasps the handle bars 16 in the usual manner to steer the front wheel 12. The bicycle 10 is propelled in a conventional manner by rotating the crank 18 through the pedals 19 which effect rotation of the front sprocket 21 and this rotation is transmitted to the rear sprocket 22 on the rear wheel 13 by the drive chain 24.

The frame 11 supports a front fork 25 which in turn is supported by the front wheel 12, and this fork is held in position on the front fork mast 27 for rotation by the handle bars 16. A luggage rack 30 is provided above the front wheel 12, and includes the parallel side members 32 having the downwardly extending legs 33 which are supported on the axle 34 of the front wheel 12. The other end 35 of the rack 30 is secured to the upper portion of the fork 25 so that the carrier pivots with the front wheel 12. The cross members 36 are rigidly secured to the side members 32 for supporting an article for transportation, and the front fender 37 is also mounted on and pivots with the front wheel 12.

The seat mast 40 extends upwardly at an angle to the vertical parallel to the fork mast 27 to support the seat 15, and the crank housing 42 in the form of a hollow tubular member is welded to the lower end of the seat mast 40, as shown in FIG. 3. The fork mast 27 and the seat mast 40 are rigidly connected near their respective lower ends by a single tube or bar 43 which extends therebetween, as shown in FIG. 1, and is welded in place so that the axis thereof lies in the plane of the axes of the masts 27 and 40.

These masts 27 and 40 are further interconnected and reinforced by a pair of lower reach bars or tubes 44 which are secured in place below the bar 43 and extend from tangential rigid weld connections with the lower ends 46 and 47 of the masts 27 and 40, as shown. Between the masts the lower reach tubes 44 are parallel to the bar 43, and rearwardly of the seat mast 40 they are deformed so that the end portions 48 thereof extend parallel to the ground for supporting the rear axle 51.

The frame 11 is further reinforced by a pair of rear reach bars or tubes 52 which extend from rigid weld connections with the lower reach bars 44 at a point thereon slightly closer to the rear seat mast 40 than to the front fork mast 27. These rear reach bars extend upwardly in a curved manner to rigid tangential connections 53 and 54 with the bar 43 and the seat mast 40, and then rearwardly in a plane parallel to the ground so that the rear portions 56 thereof extend parallel to the end portions 48 of the lower reach bars 44, as shown clearly in FIG. 1.

The vertical tube members 58 interconnect the flattened end 60 of the end portions 48 of the reach bars 44 and the rear portions 56 of the rear reach bars 52. In addition, the tube members 62 extend between the ends 60 on opposite sides of the rear wheel 13 upwardly to a rigid connection 63 at the top of the seat mast 40 for strengthening the end portion 48 of the bars 44. The members 62 also are welded at 62a to the portion 56 of the rear reach tubes 52, and an intermediate brace 64 may be secured between the members 62 to reinforce the same and to aid in mounting of the rear fender 65.

The rear luggage rack 66 includes the rear portions 56 of the tubes 52 and a removable outer peripheral member 67 which extends from releasable connections 68 on the top surface of the rear reach tubes 52 near the juncture of the rear fork members 62. The member 67 is constructed of a single tube which is deformed with the side portions 70 and the rear portions 71 which are releasably connected to the top surface of the rear ends of the reach tubes 52. Thus a flat horizontal carrying surface is provided as shown in FIG. 1, and the member 67 is secured on the top surfaces of the reach tubes 52 so that there is little stress on the screws which hold the member 67 in place.

Since no shock absorbers of any type are provided in this bicycle, large balloon tires are used on the 20 inch outer diameter wheels 12 and 13 to absorb the shock of usual bumps that the bicycle 10 encounters. Tires having a 1¾ inch diameter are preferred for this purpose. so that the bicycle is convenient for a typical adult rider, the fork mast 27 should have a length of approximately 12 inches whereas the seat mast 40 preferably has a length of about 19 inches from the center of the crank housing to the top of the mast. The rear reach tubes 52 are welded to the seat mast 40 at a point spaced about 10 inches from the center of the crank housing 42.

The masts 27 and 40 are parallel and spaced a total distance of 21 inches for convenient mounting of the bicycle and adequate spacing for cranking the pedals 19. The luggage rack 66 is disposed approximately 11 inches above the rear portions 48 of the reach bars 52 and parallel thereto as indicated above. The seat 15 and handle bars 16 may be adjusted up and down in the usual manner to accommodate the particular desires of the bicycle rider.

Another embodiment of the invention is shown in FIGS. 3–8 wherein the bicycle frame 100 is substantially identical to that described above except that a disengageable connection 101 is provided in the bar 43a and the lower reach bars 44a between the masts 27 and 40 to provide separation of the bicycle into two separate assemblies for transportation and storage. In effect, the single and lower reach bars 44a and 43a are cut in two at a point approximately 10 inches from the seat mast 40 and a male member 102 rigidly secured to the rear portions of these bars whereas the female member 104 is secured to the forward portions thereof.

As shown in FIGS. 4 and 7, the male member 102 consists of a generally triangular shaped plate 105 which has the openings 106 therein to accommodate the ends of the bar 43a and the reach tubes 44a which are rigidly welded to the flange portions 107 (FIG. 7) provided around the openings. The plate 105 is also provided with two additional smaller openings 108 which have the internally threaded flanges 109 formed around the periphery thereof to receive the threaded portions 110 of the wing nuts 111, as shown in FIG. 6 and as will be further described.

The lower edge 112 of the male plate 105 extends generally horizontally and has spaced downwardly extending tongues 114 thereon with the portion 115 of the plate therebetween deformed rearwardly to add strength to the tongues and give clearance to the screw 133. The female member 104 is generally similar in configuration to the male member 102 and has the outer peripheral flange 120 which extends slightly rearward and covers the peripheral edges 121 of the male member 102, as shown in FIG. 7. The bottom wall 122 of the female member also extends generally horizontally and has a pair of spaced openings 124 near the juncture of the bottom wall 122 and the vertical front wall 125 for receiving the tongues 114. The size of the openings 124 is slightly greater than the tongues 114 and the locations of these openings is coordinated with the spacing of these tongues so that as the male member 102 is pivotally inserted into the female member 104, the tongues are received within the openings to assemble the bicycle.

The two members 102 and 104 are rigidly interconnected by the wing nuts 111 which extend through suitable openings 126 in the front wall 125 of the female member and into the threaded portion 110 of the male member 102. The wing nuts 111 have flange portions 130 adjacent the threaded portions 110 thereof so that the male member 102 is locked between the flange 130 and the plate 105. A resilient or flexible plastic strap 132 is used to hold the wing nuts 111 on the female member 104 when the wing nuts are disengaged and this flexible member is held in place by the screw 133. Accordingly, when the bicycle is in this disassembled condition it is impossible to lose the wing nuts 111.

FIG. 8 illustrates the compact nature of the bicycle when it is disassembled and stored. The seat 15 may be easily removed by the use of a lever 15a (FIG. 1) which provides manual release of the seat. When the two portions of the bicycle are superimposed so that the wheels are one above the other the bicycle assumes a relatively small package which allows the bicycle to be placed in a small private airplane or in a pleasure boat.

Throughout this application the various components of the frames 11 and 100 have been described interchangeably as tubes or bars, and it should be understood that these terms are used as equivalent and that either solid bars or hollow tubes can be utilized without departing from the scope of the invention. Moreover, the outer diameter and shape of these tubes or bars may also be varied in size and configuration without departing from the invention.

Thus the invention has provided an improved small wheeled adult bicycle which is relatively inexpensive to manufacture since the frame is formed of standard tubing which is welded together thereby allowing the frame to be mass produced. The bicycle can easily be separated into two distinct components so that they can be easily stored or shipped, and the particular structural arrangement of the frame allows the bicycle to be produced in either the standard form as shown in FIG. 1 or the take-apart form shown in FIG. 3. The rear luggage carrier is an integral part of the frame and the members utilized thereby also reinforce the frame while providing a rigid but partially removable luggage carrier capable of supporting heavy loads.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:
1. A frame for a small wheeled bicycle comprising, a front fork mast, a seat mast extending upwardly generally parallel to said front fork mast, a pair of lower reach tubes having tangential connections to the opposite sides of the lower ends of said masts for interconnecting said masts, a single tube disposed parallel to said reach tubes and rigidly connected to said masts slightly above said tangential connections, said single tube lying in the same plane as said masts, a pair of rear reach tubes connected to said lower reach tubes near the midpoint between said masts, said rear reach tubes extending upwardly and rearwardly to rigid connections with said single tube and said seat mast, said rear reach tubes extending horizontally rearward from said seat mast to form a luggage carrier above the rear wheel of the bicycle.

2. A frame for a small wheeled bicycle comprising, a front fork mast, a seat mast extending upwardly generally parallel to said front fork mast, a pair of lower reach tubes having tangential connections to the opposite sides of the lower ends of said masts for interconnecting said masts, a single tube disposed parallel to said reach tubes and rigidly connected to said masts slightly above said tangential connections, said single tube lying in the same plane as said masts, and a pair of rear reach tubes connected to said lower reach tubes at a point between said masts and slightly closer to said seat mast than to said fork mast, said rear reach tubes being curved and extending upwardly and rearwardly to rigid tangential connections with said single tube and seat seat mast to reinforce the frame in the area of the juncture between said seat mast and said lower reach and single tubes.

3. A frame for a small wheeled bicycle comprising, a front fork mast, a seat mast extending upwardly generally parallel to said front fork mast, a pair of lower reach tubes having tangential connections to the opposite side of the lower ends of said masts for interconnecting said masts, a single tube disposed parallel to said lower reach tubes and rigidly connected to said masts slightly above said tangential connections, said single tube lying in the same plane as said masts, a pair of rear reach tubes connected to said lower reach tubes at a point between said masts, said rear reach tubes extending upwardly and rearwardly to rigid tangential connections with said single tube and said seat mast, and manual disconnect means in said single and lower reach tubes between said rear reach tubes and said fork mast for separating the frame into two distinct portions for shipment and storage.

4. A frame for a small wheeled bicycle comprising, a front fork mast, a seat mast extending upwardly generally parallel to said front fork mast, lower reach bar means having rigid connections to the lower ends of said masts for interconnecting said masts, a single tube disposed parallel to said lower reach bar means and rigidly connected to said masts slightly above said lower reach bar means, said single tube lying in the same plane as said masts, and a pair of rear reach bars connected to said lower reach bar means at a point between said masts slightly closer to said seat mast than to said fork mast, said rear reach bars being curved and extending upwardly and rearwardly to rigid tangential connections with said bar and said seat mast to reinforce the frame in the area of the juncture between said seat mast and said lower reach bar means and said single tube.

5. A frame for a small wheeled bicycle comprising, a front fork mast, a seat mast extending upwardly generally parallel to said front fork mast, a pair of lower reach tubes having tangential connections to the opposite sides of the lower ends of said fork and seat masts for interconnecting said masts, a bar disposed parallel to said lower reach tubes and rigidly connected to said fork and seat masts slightly above said tangential connections, said bar lying in the same plane as said masts, and rear reach tube means connected to said lower reach tubes at a point between said fork and seat masts and slightly closer to said seat mast than to said fork mast, said rear reach tube means being curved and extending upwardly and rearwardly to rigid connections with said bar and said seat mast to reinforce the frame in the area of the juncture between said seat mast and said lower reach tubes and said single bar.

6. A frame for a small wheeled bicycle comprising, a front fork mast, a seat mast extending upwardly generally parallel to said fork mast, a pair of lower reach tubes having tangential connections to the opposite sides of the lower ends of said fork and seat masts for interconnecting said masts, a single tube disposed parallel to said lower reach tubes and rigidly connected to said masts slightly above said tangential connections, said single tube lying in the same plane as said masts, said lower reach tubes having continuous rear portions extending rearwardly of said seat mast in a horizontal plane to provide support for the rear wheel, a pair of rear reach tubes connected to said lower reach tubes at a point between said masts and slightly closer to said seat mast than to said fork mast, said rear reach tubes being curved and extending upwardly and rearwardly to rigid tangential connections with said single tube and said seat mast to reinforce the frame in the area of the juncture between said seat mast and said lower reach and single tubes, said rear reach tubes having continuous end portions extending rearwardly of said seat mast parallel to said rear portion of said lower reach tubes, carrier means secured to and supported by said end portions of said rear reach tubes for cooperation therewith to form a carrier platform above the rear wheel, and a vertical member interconnecting said rear and end portions of said reach tubes to aid in supporting said carrier platform.

7. A bicycle frame comprising, a front fork mast, a seat mast extending upwardly generally parallel to said front fork mast, lower reach tube means having rigid connections to the lower ends of said masts for interconnecting said masts, a manually disengageable joint in said lower reach tube means between said fork and seat masts for permitting the frame to be separated into two distinct portions for storage or shipment, said joint including a male member in the form of a plate secured to the rear sections of said lower reach tube means, said plate having a pair of spaced downwardly extending tongues on the lower edge thereof, a female member on the forward section of said lower reach tube means adapted to receive said male member, said female member having a horizontal lower wall with a pair of spaced openings therein adapted to receive said tongues so that the weight of a rider on the seat mast holds said male and female members together, and means for manually locking said male and female members together.

8. A frame for a small wheeled bicycle comprising, a front fork mast, a seat mast extending upwardly generally parallel to said front fork mast, a pair of lower reach tubes having tangential connections to the opposite side of the lower ends of said masts for interconnecting said masts, a single tube disposed parallel to said lower reach tubes and rigidly connected to said masts slightly above said tangential connections, said single tube lying in the same plane as said masts, a pair of rear reach tubes connected to said lower reach tubes near the midpoint between said masts, said rear reach tubes extending upwardly and rearwardly to rigid tangential connections with said bar and said seat post, a manually disengageable joint in said lower reach and single tubes between said fork mast and said rear reach tubes for permitting the frame to be separated into two distinct portions for storage or shipment, said joint including a male member in the form of a plate secured to the rear sections of said lower reach and single tubes, said plate having a pair of spaced downwardly extending tongues on the lower edge thereof, a female member on the forward section of said lower reach and single tubes adapted to receive said male member, said female member having a horizontal lower wall with a pair of spaced openings therein adapted to receive said tongues so that the weight of a rider on the seat mast holds said male and female members together, and means for manually locking said male and female members together.

9. A frame for a small wheeled bicycle comprising, a front fork mast, a seat mast extending upwardly generally parallel to said front fork mast, a pair of lower reach tubes having tangential connections to the opposite sides of the lower ends of said masts for interconnecting said masts, a single tube disposed parallel to said lower reach tubes and rigidly connected to said masts slightly above said tangential connections, said single tube lying in the same plane as said masts, a pair of rear reach tubes connected to said lower reach tubes near the midpoint between said masts, said rear reach tubes extending upwardly and rearwardly to rigid tangential connections with said bar and said seat post, a manually disengageable joint in said lower reach and single tubes between said fork mast and said rear reach tubes for permitting the frame to be separated into two distinct portions for storage or shipment, said joint including a male member in the form of a plate secured to one portion of said lower reach and single tubes, said plate having downwardly extending tongue means thereon, a female member on the other portion of said lower reach and single tubes adapted to receive said male member, said female member having a horizontal lower wall with a pair of spaced openings therein adapted to receive said tongues so that the weight of a rider on the seat mast holds said male and female members together, and means for manually locking said male and female members together.

10. A bicycle frame comprising, a front fork mast, a seat mast extending upwardly generally parallel to said front fork mast, three reach tubes having rigid connections to each of said masts for interconnecting said masts, two of said reach tubes being parallel having tangential connections with said seat mast and extending rearwardly of said seat mast to form at least a portion of a rear fork, the third of said reach tubes lying in the same plane as said fork and seat masts, a single manually disengageable joint in said three reach tubes between said fork and seat masts for permitting the frame to be separated into two distinct portions for storage or shipment, said joint including a first member secured to the rear sections of said reach tubes, a second member on the forward section of said reach tubes adapted to receive said first member, one of said first and second members having vertically extending tongue means on the lower portion thereof, said other of said members having a horizontal lower wall with opening means therein adapted to receive said tongue means so that the weight of a rider on the seat mast holds said first and second members together, and means for manually locking said first and second members together.

11. A bicycle frame comprising, a front fork mast, a seat mast extending upwardly generally parallel to said front fork mast, a plurality of reach tubes having rigid connections to each of said masts for interconnecting said masts, at least two of said reach tubes being parallel and having connections with said seat mast and extending rearwardly of said seat mast to form at least a portion of a rear fork, a manually disengageable joint in said reach tube between said fork and seat masts for permitting the frame to be separated into two distinct portions for storage or shipment, said joint including a first member secured to the rear sections of said reach tubes, a second member on the forward section of said reach tubes adapted to receive said first member, one of said first and second members having tongue means on the lower portion thereof, said other of said members having a horizontal lower wall with opening means therein adapted to receive said tongue means so that the weight of a rider on the seat mast holds said first and second members together during operation of the bicycle, and means for manually locking said first and second members together so that said two portions are securely locked together.

12. A frame for a small wheeled bicycle comprising, a front fork mast, a seat mast extending upwardly generally parallel to said front fork mast, a pair of lower reach tubes having rigid connections to the opposite side of the lower ends of said masts for interconnecting said masts, a single tube disposed substantially parallel to said lower reach tubes and rigidly connected to said masts slightly above said rigid connections, said single tube lying in the same plane as said seat and front fork masts, a pair of rear reach tubes connected to said lower reach tubes at a point between said masts, said rear reach tubes extending upwardly and rearwardly to rigid tangential connections with said single tube and said seat mast, and manual means in said single and lower reach tubes between said rear reach tubes and said front fork mast for permitting the lengthwise dimension of the frame to be reduced for shipment and storage.

References Cited by the Examiner

UNITED STATES PATENTS

| | | | |
|---|---|---|---|
| D. 92,523 | 6/1934 | Clark. | |
| 943,330 | 12/1909 | Yearke | 285—283 |
| 1,977,470 | 10/1934 | Clark | 280—281 |
| 2,211,164 | 8/1940 | Rippenbein | 280—287 |
| 2,440,091 | 5/1948 | Hoyt | 280—287 |
| 2,755,103 | 7/1956 | Douglas | 280—281 |
| 2,883,205 | 4/1959 | Dulski | 280—287 X |
| 3,106,412 | 10/1963 | Liljenberg | 280—287 |

FOREIGN PATENTS

| | | |
|---|---|---|
| 881,710 | 2/1943 | France. |
| 965,246 | 2/1950 | France. |
| 1,012,713 | 4/1952 | France. |
| 1,019,111 | 10/1952 | France. |
| 30,805 | 12/1909 | Sweden. |

KENNETH H. BETTS, *Primary Examiner.*